US012074404B2

(12) United States Patent
Urtz, Jr. et al.

(10) Patent No.: US 12,074,404 B2
(45) Date of Patent: Aug. 27, 2024

(54) TORQUE LIMITING CLAMP FOR HELICAL OUTER CONDUCTOR CABLES

(71) Applicant: John Mezzalingua Associates, LLC, Liverpool, NY (US)

(72) Inventors: Thomas Sawyer Urtz, Jr., North Syracuse, NY (US); Jeremy Charles Benn, Baldwinsville, NY (US)

(73) Assignee: John Mezzalingua Associates, LLC, Liverpool, NY (US)

(*) Notice: Subject to any disclaimer, the term of this patent is extended or adjusted under 35 U.S.C. 154(b) by 363 days.

(21) Appl. No.: 17/293,768

(22) PCT Filed: Nov. 26, 2019

(86) PCT No.: PCT/US2019/063336
§ 371 (c)(1),
(2) Date: May 13, 2021

(87) PCT Pub. No.: WO2020/112833
PCT Pub. Date: Jun. 4, 2020

(65) Prior Publication Data
US 2022/0131285 A1 Apr. 28, 2022

Related U.S. Application Data
(60) Provisional application No. 62/773,573, filed on Nov. 30, 2018.

(51) Int. Cl.
*H01R 9/05* (2006.01)
*H01R 13/52* (2006.01)

(52) U.S. Cl.
CPC ....... *H01R 9/0524* (2013.01); *H01R 13/5205* (2013.01)

(58) Field of Classification Search
CPC .............................. H01R 9/0524; H01R 13/05
See application file for complete search history.

(56) References Cited

U.S. PATENT DOCUMENTS

| | | | | |
|---|---|---|---|---|
| 5,167,533 A * | 12/1992 | Rauwolf | H01R 24/566 439/583 |
| 6,293,824 B1 | 9/2001 | Guerin et al. | |
| 6,951,481 B2 * | 10/2005 | Dykstra | H01R 9/0521 439/578 |

(Continued)

OTHER PUBLICATIONS

International Searching Authority, International Search Report and Written Opinion, Date of Mailing: Mar. 20, 2020, Date completed: Mar. 20, 2020 (12 Pages).

(Continued)

*Primary Examiner* — Briggitte R. Hammond
(74) *Attorney, Agent, or Firm* — Barclay Damon LLP

(57) ABSTRACT

An RF connector that has a main body, a clamp, and a cap. The connector has an internal torque limiting mechanism that enables the connector to be installed in the field such that the connector is correctly positioned at the axial stop point of the RF cable during insertion. This is enabled by an internal preloaded cap/seal interface that requires a predetermined breakaway torque to cause the cap to rotate relative to the clamp. The breakaway torque is less than a torque that would be required to over-install the connector.

19 Claims, 11 Drawing Sheets

(56) References Cited

U.S. PATENT DOCUMENTS

| | | | | |
|---|---|---|---|---|
| 7,931,499 | B2 * | 4/2011 | Islam | H01R 13/6277 439/584 |
| 9,257,780 | B2 * | 2/2016 | Thomas | H01R 13/5205 |
| 9,905,959 | B2 * | 2/2018 | Burris | H01R 13/5205 |
| 9,997,875 | B2 * | 6/2018 | Roe | F16D 9/06 |
| 2005/0037664 | A1 * | 2/2005 | Weidner | H01R 9/05 439/581 |
| 2010/0190377 | A1 | 7/2010 | Islam | |
| 2012/0064764 | A1 | 3/2012 | Islam | |
| 2012/0100745 | A1 | 4/2012 | Myong et al. | |
| 2013/0029541 | A1 | 1/2013 | Chiarelli et al. | |
| 2014/0045356 | A1 | 2/2014 | Natoli | |
| 2017/0077642 | A1 | 3/2017 | Benham et al. | |

OTHER PUBLICATIONS

International Preliminary Examing Authority, International Preliminary Report on Patentability, Date of mailing: Jun. 2, 2021; Date of completion: May 28, 2021 (7 pages).

European Patent Office, Extended European Search Report, Application No. 19888307.6, Dated: Aug. 18, 2022, 12 pages.

Canadian Intellectual Property Office, Examiner's Report, Application No. 3,119,787, Dated: Dec. 11, 2023, 7 pages.

* cited by examiner

TORQUE LIMITING CLAMP FOR HELICAL OUTER CONDUCTOR CABLES

BACKGROUND OF THE INVENTION

Field of the Invention

The present invention relates to wireless communications, and mom particularly, to RF connectors for wireless communications infrastructure.

Related Art

RF cables with helical outer conductors (for example, "Superflex" cables) have proven to be very effective and durable for use in cellular infrastructure, particularly in deployment environments that require superior flexibility to connect cellular antennas to their corresponding radio remote units. Examples include dense urban environments, in which small cell antennas may be installed on the sides of buildings, the tops of lamp posts, and in proximity to subway entrances, etc. Another urban deployment that requires superior cable flexibility includes large venues such as stadiums, in which small cell antennas may be mounted onto the stadium structure, and RF cables must be routed along complex paths from the antenna to the associated radio remote units.

A common feature of both deployments is that the RF cable must typically be cut to a specific length in the field, which requires technicians to assemble the cables at the site. Assembling the cables involves installing connectors to the ends of the Superflex cables. In many deployments, connectors with a 90 degree bend are desired due to space constraints surrounding the antenna and/or the remote radio head equipment.

Two challenges arise in installing connectors on site. First, in order to maintain low return loss and minimize the risk of passive intermodulation distortion (PIM), the location of the axial stop point of the cable must be precise. The axial stop point refers to the distance from the end of the cable conductor to the point where the cable's polymer insulating jacket ends. It also defines the point along the cable axis at which the connector must be positioned for optimal electrical connection. The polymer jacket is typically of a malleable material. Accordingly, it is easy for a technician to over or under install the clamp portion of the connector to the cable. Either case can result in the cable/connector interface having unacceptable return loss and/or PIM.

Second, if 90 degree bend connectors are being used (which occurs very frequently in urban or large venue deployments as described above), it is extremely difficult to install the connector so that the rotational angle of the orthogonal portion of the connector is at the desired orientation. This is primarily due to the helical outer conductor. A connector designed for use with a Superflex cable has a clamp portion that is threaded. The threads of the clamp match the helical configuration of the outer conductor of the Superflex cable. As mentioned above, the axial stop point of the cable must be set at a precise distance. Given the helical threads of the outer conductor (and the clamp of the connector), it is unlikely that rotationally installing the clamp onto the helical outer conductor will result in the rotational angle of the orthogonal portion of the connector being at the desired orientation. There are ways to overcome this, but it is difficult and extremely time consuming.

Accordingly, what is needed is a connector for a helical outer conductor cable that enables precise installation at the correct axial stop point while enabling setting the rotational angle of a 90 degree bend connector after the clamp is installed onto the cable.

SUMMARY OF THE INVENTION

An aspect of the present invention involves an RF connector. The RF connector comprises a main body; a clamp that is configured to translate relative to the main body along a radial axis; and a cap seal interposed between the body assembly and the clamp, wherein the seal makes contact with the clamp at a clamp/seal interface, wherein the clamp/seal interface is configured to keep the clamp and the cap rotationally fixed to each other when subject to a torque that is less than a breakaway torque, and wherein the cap and the clamp rotate rotate relative to each other when subject to a torque that is greater than the breakaway torque.

Another aspect of the present invention involves an RF connector. The RF connector comprises a main body; a clamping means; and a torque limiting means.

DESCRIPTION OF EXEMPLARY EMBODIMENTS

Figure 1A:
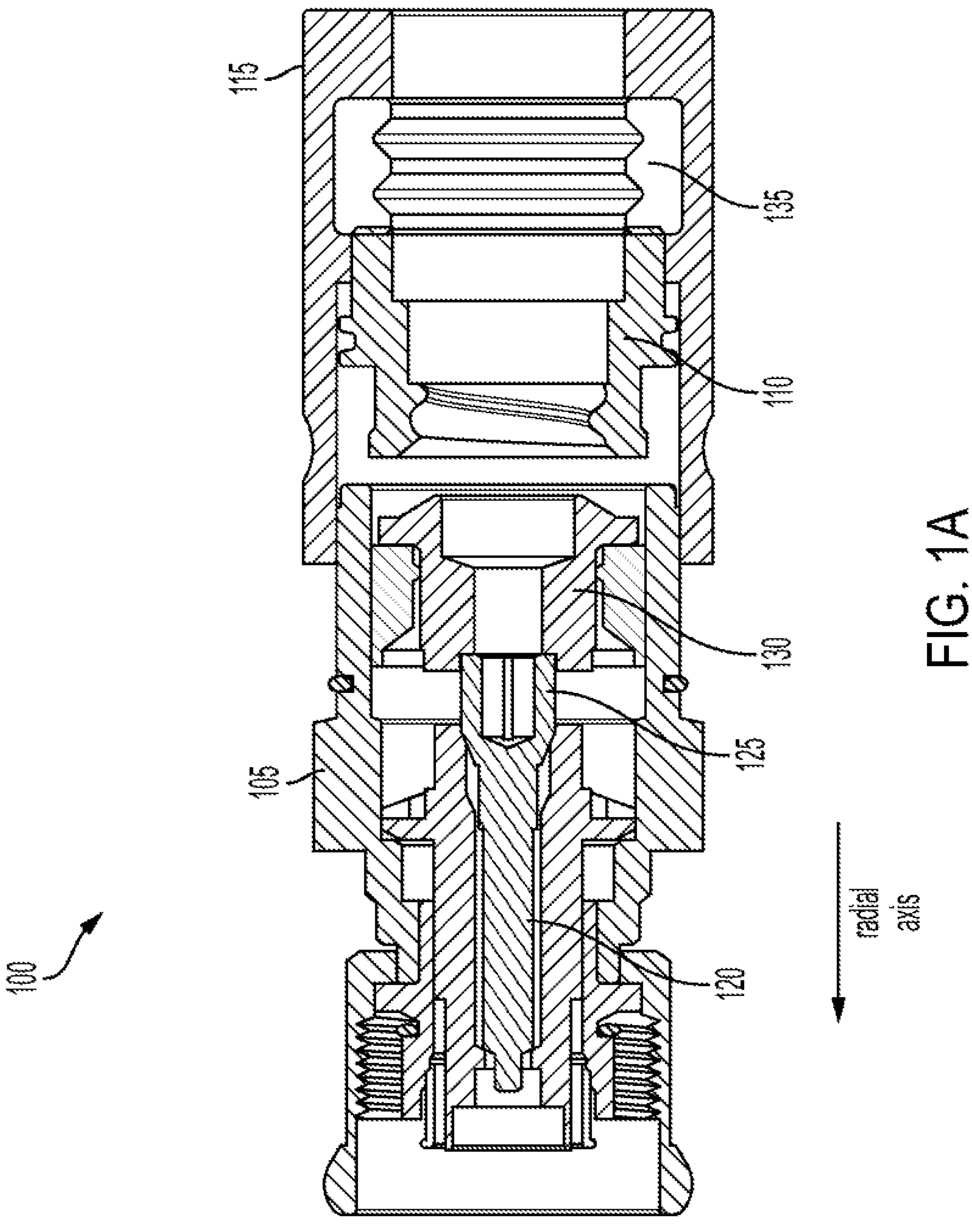
FIG. 1*a* illustrates a cross section of an exemplary torque-limited RF connector according to the disclosure.

FIG. 1*a* illustrates a cross section of a torque-limited RF connector 100 according to the disclosure (hereinafter referred to as "connector 100"). Connector 100 includes a main body assembly 105, which may include a cap 115, and a torque-limiting clamp 110. Connector 100 may be a compression-style connector, which is installed on the end of a cable using a compression gun (not shown) according to a method further disclosed below. Main body assembly 105 and cap 115 may be rotationally fixed so that although cap 115 may be able to translate axially with respect to main body assembly 105, it does not rotate relative to main body assembly 105. Further illustrated within main body assembly 105 are connector inner conductor 120; inner conductor receptacle 125; and contact cone 130. Disposed within cap 115 is a cap seal 135.

Figure 1B:
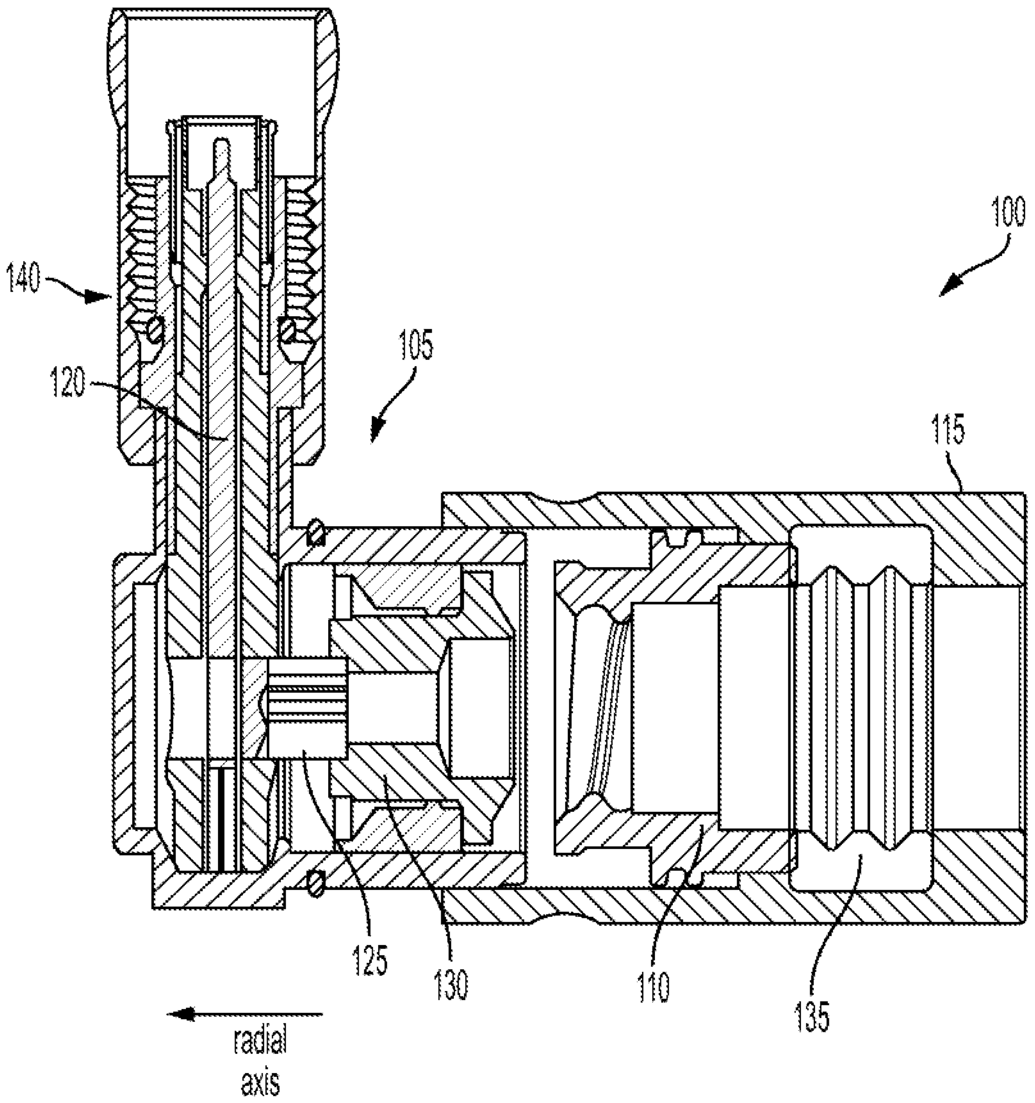
FIG. 1*b* illustrates a cross section of an exemplary 90 degree torque-limited RF connector according to the disclosure.

FIG. 1*b* illustrates a 90 degree variant of connector 100, which may have substantially the same components of the connector 100 discussed above. One notable difference is the discontinuity of center conductor 120 where it meets inner conductor receptacle 125. The discontinuous portion of center conductor 120 comes into full electrical contact with inner conductor 120 once the connector 100 is compressed into its swaged state (described below). As illustrated, the 90 degree variant of connector 100 has an orthogonal portion 140 that has a 90 degree angle relative to the radial axis.

Further illustrated in FIGS. 1*a* and 1*b* is the radial axis.

Figure 2:
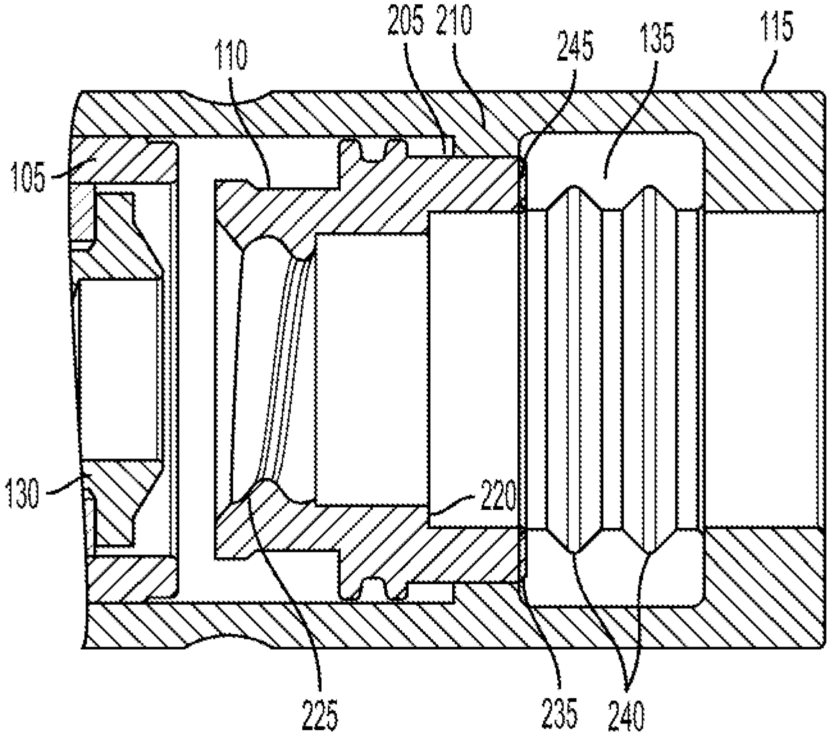
FIG. 2 is a close-up view of a portion of the cross section of torque-limited RF connector of FIGS. 1*a* and 1*b*.

FIG. 2 is a close up view of a cross section of connector 100. Illustrated are clamp 110, main body assembly 105, contact cone 130, cap 115, and cap seal 135 disposed within a cavity formed within cap 115. Cap seal 135 may have a plurality of indents 240 that help it engage with the outer surface of the cable polymer jacket when connector 100 is installed. Cap seal 135 may be formed of a solid material having properties that provide a defined resistance to torque through friction generated by a mechanical fit, such as deformation-generated friction. Examples may include silicone rubber or other elastomer or elastomeric foam, or other materials such as a polymer or ceramic. It will be understood that such variations are possible and within the scope of the disclosure. As illustrated, clamp 110 has a clamp thread 225, which has a helical shape that substantially matches the shape of the helical outer conductor of the cable to which connector 100 will be installed. Clamp 110 further has a stop ledge 220, which has a rearward-facing surface that is orthogonal to the radial axis, which engages the forward-facing surface of the edge of the outer insulator of the RF cable (e.g., a cable polymer jacket (not shown)) as clamp 110 is screwed onto the helical outer conductor of the cable. The point at which stop ledge 220 makes contact with the prepared edge of the cable polymer jacket corresponds to the axial stop point. Clamp 110 further includes a floating restraint groove 205 formed on the outer surface of clamp 110, which engages with a floating restraint tab 210 formed on the inner surface of cap 115, thereby preventing clamp 110 from axially translating relative to cap 115. Variations to the clamp 110 and cap 115 are possible and within the scope of the disclosure. For example, the floating restraint tab 210 may be disposed on the outer surface of clamp 110 and the floating restraint groove may be formed in the inner surface of cap 115. Further, cap 115 may be integrated within main body assembly 105 as a single unit.

The dimensions of cap seal 135 are such that when the floating restraint tab 210 of cap 115 is engaged with floating restraint groove 205, a rearward edge 245 of clamp 110 extends into and exerts pressure on a forward surface of cap seal 135, forming a preloaded clamp/seal interface 235. The pressure formed at clamp/seal interface 235 may be such that clamp 110 and cap 115 are rotationally fixed until a breakaway torque $T_B$ is applied, which is sufficient to overcome the friction and pressure formed at clamp/seal interface 235. When a torque exceeding $T_B$ is exerted on cap 115 relative to clamp 110, cap 115 (and thus main body assembly 105) rotates relative to clamp 110. Accordingly, the combination of the clamp 110 and cap seal 135 forming the preloaded cap/seal interface 235 may act as a torque limiting means to assure a proper connection in installing the connector 100 onto prepared cable 300. Torque value $T_B$ may generally fall in the range of 1 to 3 N-m.

Figure 3A:
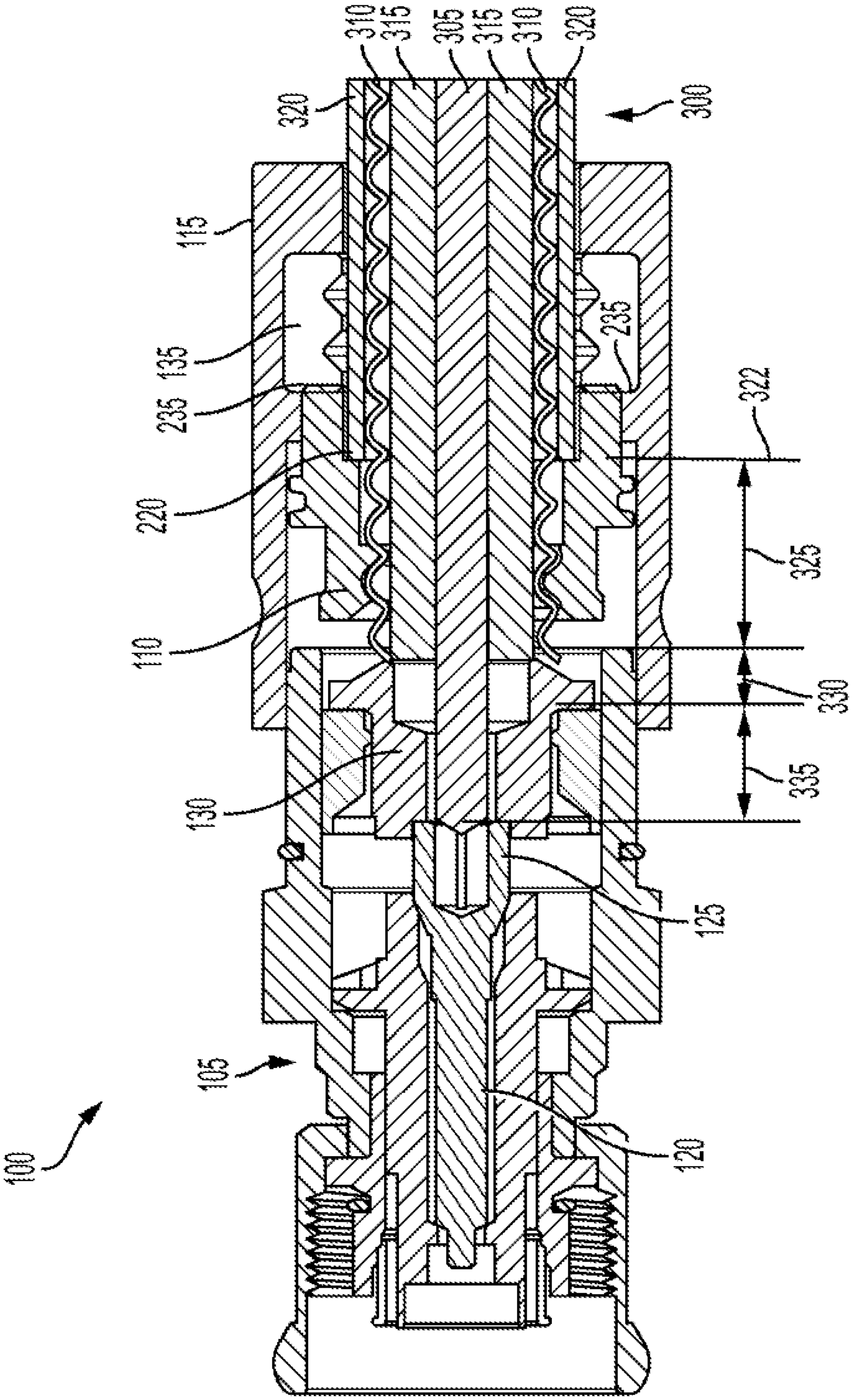
FIG. 3*a* illustrates a cross section of the torque-limited RF connector of FIG. 1*a* in the process of being installed onto a prepared RF cable (e.g., in a pre-swaged state).

FIG. 3*a* illustrates a cross section of the connector 100 in the process of being installed onto a prepared RF cable (e.g., in a pre-swaged state). Illustrated in FIG. 3*a* is connector 100 and prepared RF cable 300. Prepared RF cable 300 has an inner conductor 305; a coaxial helical outer conductor 310; a coaxial dielectric 315 disposed between the inner conductor 305 and the helical outer conductor 310; and a polymer jacket 320. Prepared RF cable 300 further includes an exposed threaded cable portion 325; an exposed dielectric portion 330; and an exposed inner conductor portion 335. The polymer jacket 320 ends (and the exposed threaded cable portion 325 begins) at axial stop point 322.

As illustrated in FIG. 3*a*, connector 100 is in the process of being installed, wherein clamp thread 225 has engaged exposed helical cable outer conductor 325 and connector 100 has been installed onto the cable until the stop ledge 220 has made contact with the edge of polymer jacket 320 at axial stop point 322. The material used for cap seal 135 and the preloaded pressure at clamp/seal interface 235 should be such that the breakaway torque $T_B$ should be less than the torque required that would cause clamp 110 to continue translating and overcome the polymer jacket, which would result in over-installing of the connector. With a proper breakaway torque $T_B$, once the stop ledge 220 has made contact with the polymer jacket, the applied torque that is greater than breakaway torque TB will cause the cap 115 to rotate relative to clamp 110 and clamp 110 will stop rotating relative to helical outer conductor 310. Thereby, clamp 110 will stop axially translating, preventing damage to the prepared RF cable 300 and preventing over-installation of the connector 100. Further, breakaway torque $T_B$ should be sufficiently greater than the nominal torque required to thread clamp 110 onto the exposed threaded cable portion 325 such that the breakaway torque $T_B$ will not be exceeded before the stop ledge 220 has made contact with the edge of polymer jacket 320 at axial stop point 322. In other words, the technician will not inadvertently under-install the connector 100 to the prepared RF cable 300.

At this point, given that clamp 110 is fixed relative to prepared RF cable 300, and both cap 115 and main body assembly 105 may freely rotate in unison about axial radius (as long as the torque exerted exceeds the breakaway torque $T_B$), then the technician may rotationally position connector main body assembly 105 at its desired angle.

Figure 3B:
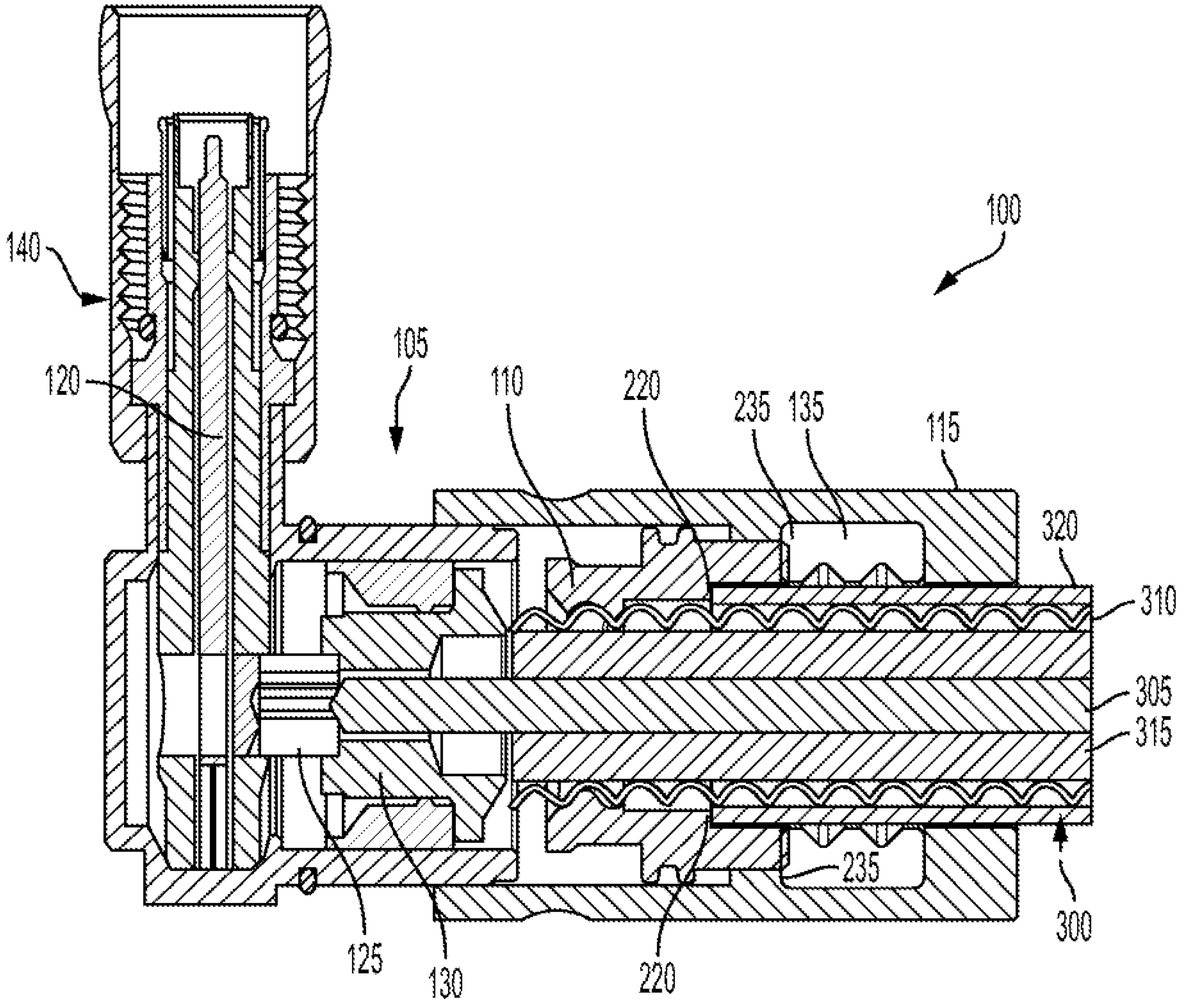
FIG. 3*b* illustrates a cross section of the 90 degree torque-limited RF connector of FIG. 1*b* in the process of being installed onto a prepared RF cable.

FIG. 3*b* illustrates the 90 degree variant of connector 100 in the same state of connection as discussed above regarding FIG. 3*a*. At this (pre-swage) installation stage, the technician may rotate the main body assembly 105 so that the orthogonal portion 140 is at the desired angle about the radial axis. In doing so, the technician may have to rotate the main body assembly 105 by applying a torque greater than the breakaway torque $T_B$ so that the main body assembly 105 may rotate relative to the clamp 110.

Figure 4:
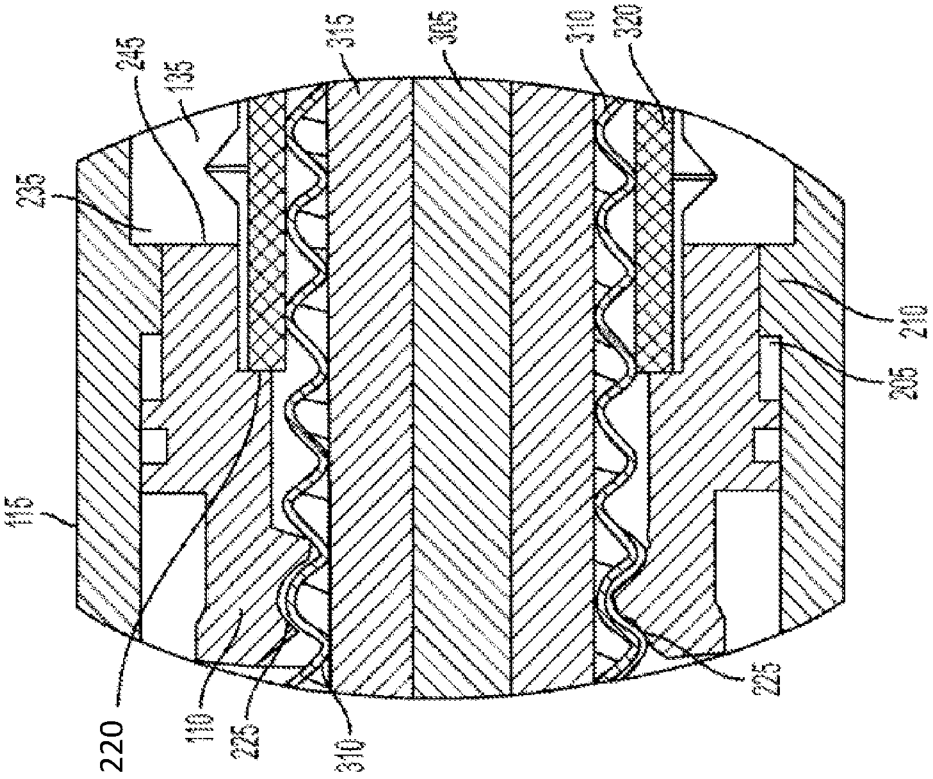
FIG. 4 is a close-up view of a portion of the cross section of the torque-limited RF connector of FIGS. 3*a* and 3*b*.

FIG. 4 is a close-up view of a portion of the cross section of both straight and 90 degree variants of connector 100. As illustrated, clamp thread 225 has engaged the outer surface of helical outer conductor 310, and the stop ledge 220 of clamp 110 has contacted the edge of polymer jacket 320. The torque required to continue turning main body assembly 105, cap 115, and clamp 110 is at this stage greater than the breakaway torque $T_B$ imposed at clamp/seal interface 235, thereby assuring proper connection at the axial stop point 322. In other words, as the technician rotates connector 100 onto prepared cable 300, once the connector has reached the axial stop point 322, the main body assembly 105 and clamp 115 will rotate relative to prepared cable 300 (the clamp 110 is now fixed relative to prepared cable 300) and the connector 100 will cease in its translation along the radial axis.

At this stage of the installation of connector 100 (either straight or 90 degree), the technician may use a compression gun or similar tool to compress the main body assembly 105 and cap 115 to the clamp 110 to form firm electrical connections between the inner conductors and the outer conductors, respectively. This is the transition from the pre-swaged to the swaged state.

Figure 5A:
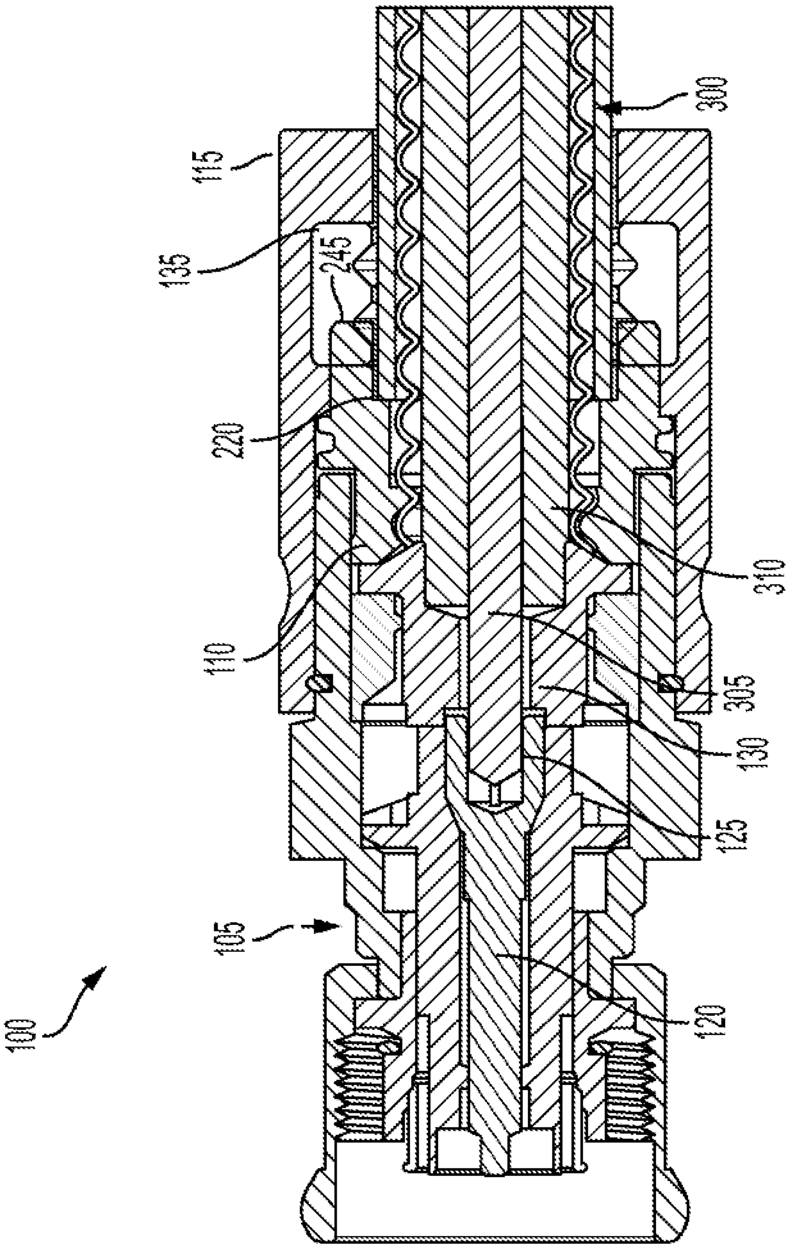
FIG. 5*a* illustrates a cross section of the torque-limited RF connector of FIG. 1*a* fully installed on a prepared RF cable (e.g., in a swaged state).

FIG. 5*a* illustrates a cross section of the connector 100 fully installed on prepared RF cable 300 (e.g., in a swaged state). In the swaged state, connector 100 is rotationally fixed relative to prepared RF cable 300 around the radial axis. In transitioning the connector 100 from the pre-swaged state (FIG. 3*a/b*) to the swaged state (FIG. 5*a/b*), the technician may use a compression gun or similar to complete the connector installation process, causing the connector main body assembly 105 to forcibly translate backward along the radial axis relative to the prepared RF cable 300 and the cap 115. In doing so (these actions may happen simultaneously), the inner conductor 305 of cable 300 translates into inner conductor receptacle 125 of connector 100; clamp 110 and contact cone 130 press together and deform the forward-most portion of the helical outer conductor 310 and form conductive continuity between clamp 110, outer conductor 310, and main body assembly 105; and the combination of clamp 110 and contact cone 130 are pressed against main body assembly 105.

Figure 5B:
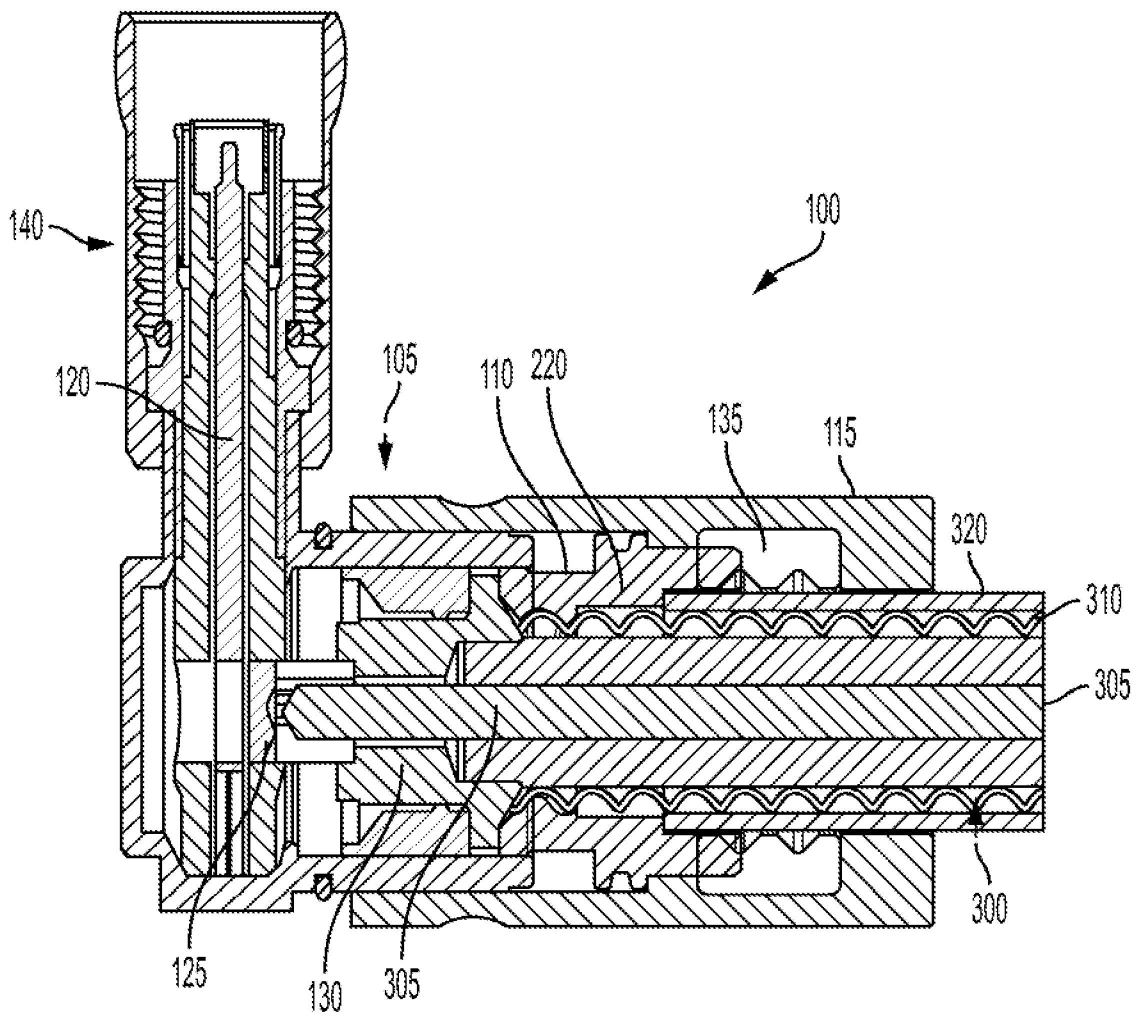
FIG. 5*b* illustrates a cross section of the torque-limited RF connector of FIG. 1*b* fully installed on a prepared RF cable.

FIG. 5*b* illustrates a cross section of the 90 degree variant of connector 100 in the swaged state. Similar to that illustrated in FIG. 5*a*, the helical outer conductor 310 gets compressed, and the clamp 110 and contact cone 130 translates and gets compressed within main body assembly 105. A distinction with the 90 degree variant of connector 100 is that, in the swaged state, inner conductor receptacle 125 translates forward to where it is in full electrical contact with orthogonally-oriented inner conductor 120. Further, in the swaged state, orthogonal portion 140 becomes rotationally fixed around the radial axis.

Figure 6A:
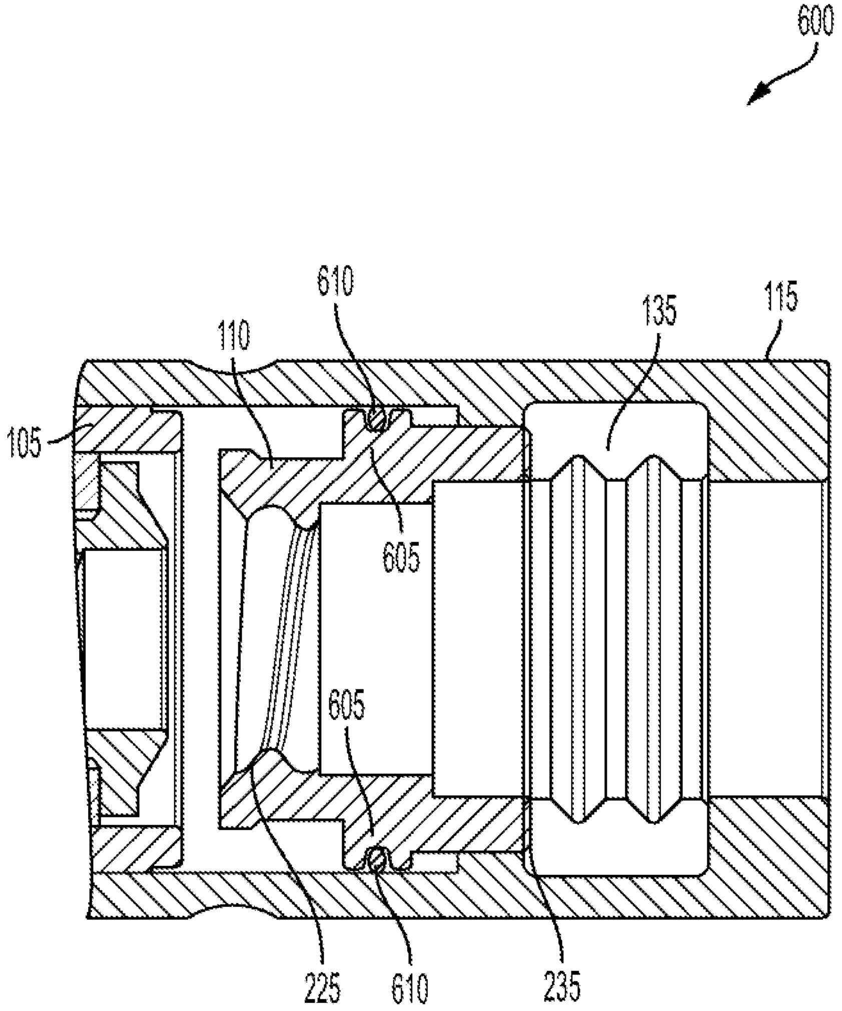
FIG. 6*a* illustrates a closeup similar to FIG. 4 of a first variation in which a seal is disposed radially between the clamp and an inner surface of the main body assembly.

FIG. 6*a* illustrates a closeup similar to FIG. 4 of an exemplary connector 600 in which a seal is disposed radially between the clamp 110 and an inner surface of cap 105 of the main body assembly 105. In this example, the seal may be an O-ring 610 that may be disposed within groove 605 formed on the outer surface of clamp 110. In this example, the rotational friction provided by the pressure of O-ring 610 on cap 115 and the interior surface of groove 605 may provide sufficient friction to require a breakaway torque $T_B$ to enable the main body assembly 105 to rotate relative to the clamp 110. The seal based on O-ring 610 may be either an alternative to, or a supplement to, the friction provided by cap/seal interface 235.

Figure 6B:
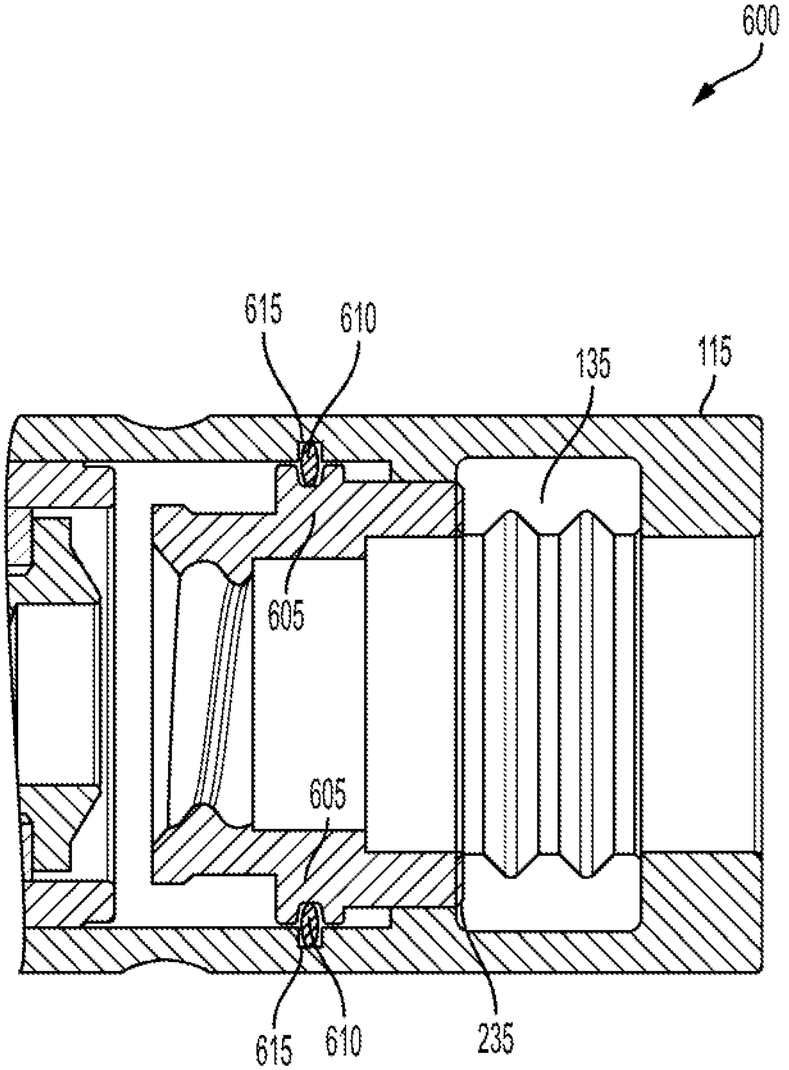
FIG. 6*b* illustrates a closeup similar to FIG. 4 of a second variation in which a seal is disposed radially between the clamp and an inner surface of the main body assembly.

FIG. 6*b* illustrates a closeup similar to that of FIG. 6*a*, but of a variation to connector 600. In this variation, in addition to groove 605 formed on the outer surface of clamp 110, them is a corresponding groove 615 formed on the inner surface of cap 115.

Figure 7:
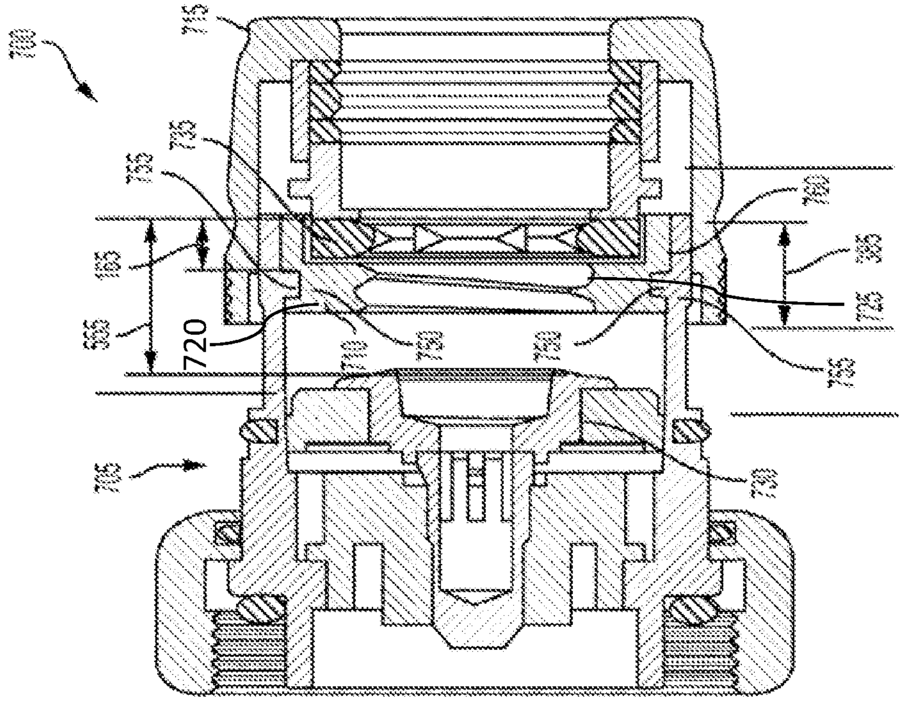
FIG. 7 illustrates another exemplary connector having an alternative structure for providing pressure at a clamp/seal interface.

FIG. 7 illustrates an exemplary torque limited connector 700 having an alternative structure for providing pressure at a clamp/seal interface. Connector 700 has a main body assembly 105 that may include a cap 715, and a contact cone 730. Clamp 720 may include a threaded portion 725 and may have an outer cylindrical portion 760 that surrounds seal 735 at its outer radial surface. Clamp 720 may provide pressure on seal 735 by being translationally fixed by a floating restraint tab 755 disposed on an inner surface of main body assembly 705, which mechanically engages with floating restraint groove 750 formed on the outer radial surface of clamp 710. In a variation, floating restraint tab 755 may be disposed on the outer surface of clamp 710 and the floating restraint groove 750 may be formed on the inner surface of main assembly body 705. It will be understood that such variations are possible and within the scope of the disclosure.

What is claimed is:

1. An RF connector, comprising:

a main body assembly extending along a radial axis an comprising, a cap configured to translate along the radial axis, a clamp positioned inside the cap; and a seal interposed between the clamp and the cap, wherein a clamp/seal interface is configured to keep the clamp and the cap rotationally fixed to each other while translating along the radial axis when subject to a torque that is less than a breakaway torque, and wherein the cap and the clamp rotate relative to each other when subject to a torque that is greater than the breakaway torque.

2. The RF connector of claim 1, wherein the cap and clamp are held translationally fixed along the radial axis by a floating restraint tab and a floating restraint groove, wherein the floating restraint tab engages the floating restraint groove.

3. The RF connector of claim 2, wherein the floating restraint tab is disposed on an inner surface of the cap and the floating restraint groove is disposed on an outer surface of the clamp.

4. The RF connector of claim 2, wherein the clamp includes a rearward edge that presses against a forward surface of the seal.

5. The RF connector of claim 1, wherein the seal is interposed radially between the clamp and the cap.

6. The RF connector of claim 5, wherein the seal comprises an O-ring.

7. The RF connector of claim 6, wherein the seal is disposed within a first groove formed on an outer surface of the clamp.

8. The RF connector of claim 7, wherein the seal is further disposed with a second groove formed on an inner surface of the cap.

9. The RF connector of claim 1, wherein the clamp comprises a thread that engages with a helical outer conductor of an RF cable.

10. The RF connector of claim 1, wherein the clamp comprises a stop ledge.

11. The RF connector of claim 10, wherein the clamp is configured so that when the RF connector translates along the radial axis in response to an installation torque, when a forward surface of an outer insulator of an RF cable makes contact with the stop ledge, a required torque to continue translating along the radial axis is greater than the breakaway torque.

12. The RF connector of claim 1, wherein the seal comprises one or more of an elastomer and an elastomeric foam.

13. The RF connector of claim 12, wherein the seal provides a resistance to torque through compressive deformation-generated friction.

14. The RF connector of claim 1, wherein the seal comprises a solid material having properties which provide defined resistance to torque through friction generated by mechanical fit.

15. The RF connector of claim 14, wherein the seal comprises a polymer.

16. The RF connector of claim 1, wherein the main body assembly has an orthogonal portion.

17. An RF connector, comprising:

a main body comprising, a cap, a cap seal positioned within the cap, and a clamping means, wherein the clamping means and the cap seal form a preloaded cap/seal interface that acts as a torque limiting means.

18. The RF connector of claim 17, wherein the main body extends along a radial axis and the cap is configured to translate axially along the radial axis.

19. The RF connector of claim 17, wherein the cap is configured to translate relative to the main body.

* * * * *